(12) United States Patent
Kawato et al.

(10) Patent No.: US 10,875,969 B2
(45) Date of Patent: *Dec. 29, 2020

(54) COMPOSITION FOR FORMING COATING FILM AND METHOD FOR FORMING COATING FILM USING SAME

(71) Applicant: AZ Electronic Materials (Luxembourg) S.a.r.l., Luxembourg (LU)

(72) Inventors: Shunji Kawato, Kakegawa (JP); Yuki Ozaki, Kakegawa (JP); Noboru Satake, Kakegawa (JP); Masakazu Kobayashi, Kakegawa (JP); Hironori Endo, Isehara (JP)

(73) Assignee: Merck Patent GmbH, Darmstadt (DE)

( * ) Notice: Subject to any disclaimer, the term of this patent is extended or adjusted under 35 U.S.C. 154(b) by 82 days.

This patent is subject to a terminal disclaimer.

(21) Appl. No.: 15/567,846

(22) PCT Filed: Mar. 23, 2016

(86) PCT No.: PCT/EP2016/000500
§ 371 (c)(1),
(2) Date: Oct. 19, 2017

(87) PCT Pub. No.: WO2016/169631
PCT Pub. Date: Oct. 27, 2016

(65) Prior Publication Data
US 2018/0201736 A1    Jul. 19, 2018

(30) Foreign Application Priority Data
Apr. 20, 2015  (JP) ................. 2015-086203

(51) Int. Cl.
| | | |
|---|---|---|
| *C08G 77/62* | (2006.01) | |
| *C08J 3/28* | (2006.01) | |
| *C08J 5/18* | (2006.01) | |
| *C08K 5/5419* | (2006.01) | |
| *C08K 5/5425* | (2006.01) | |
| *C08K 5/544* | (2006.01) | |
| *C08L 83/16* | (2006.01) | |
| *C09D 183/14* | (2006.01) | |
| *C09D 183/16* | (2006.01) | |

(52) U.S. Cl.
CPC ............. *C08G 77/62* (2013.01); *C08J 3/28* (2013.01); *C08J 5/18* (2013.01); *C08K 5/544* (2013.01); *C08K 5/5419* (2013.01); *C08K 5/5425* (2013.01); *C08L 83/16* (2013.01); *C09D 183/14* (2013.01); *C09D 183/16* (2013.01); *C08J 2383/16* (2013.01); *C08L 2201/14* (2013.01); *C08L 2203/16* (2013.01)

(58) Field of Classification Search
CPC ..... C08G 77/62; C08J 3/28; C08J 5/18; C08J 2383/16; C08K 5/5419; C08K 5/5425; C08K 5/544; C08L 83/16; C08L 2201/14; C08L 2203/16; C09D 183/14; C09D 183/16
USPC ........................................................ 524/864
See application file for complete search history.

(56) References Cited

U.S. PATENT DOCUMENTS

| | | |
|---|---|---|
| 5,747,623 A | 5/1998 | Matsuo et al. |
| 5,914,151 A | 6/1999 | Usuki |
| 6,255,373 B1 | 7/2001 | Akamatsu et al. |
| 6,329,487 B1 | 12/2001 | Abel et al. |
| 8,427,620 B2 | 4/2013 | Saito et al. |
| 9,368,746 B2 | 6/2016 | Lee et al. |
| 2008/0305611 A1 | 12/2008 | Hirota |
| 2010/0159255 A1 | 6/2010 | Lee et al. |
| 2010/0166977 A1 | 7/2010 | Brand et al. |
| 2011/0091722 A1 | 4/2011 | Koehne et al. |
| 2014/0011009 A1 | 1/2014 | Fish |
| 2014/0127518 A1 | 5/2014 | Ishikawa |
| 2014/0203323 A1* | 7/2014 | Ozai ................. C09D 183/16 257/100 |
| 2015/0017335 A1 | 1/2015 | Werner |
| 2016/0017230 A1 | 1/2016 | Marrwitz et al. |
| 2016/0244638 A1 | 8/2016 | Ozaki et al. |

FOREIGN PATENT DOCUMENTS

| | | | |
|---|---|---|---|
| CN | 102399447 A | 4/2012 | |
| DE | 102013004170 A1 | 9/2014 | |
| EP | 0553839 A2 * | 8/1993 | ........... C08G 77/485 |
| JP | H05238827 A | 9/1993 | |
| JP | H06073340 B2 | 9/1994 | |
| JP | H08112879 A | 5/1996 | |

(Continued)

OTHER PUBLICATIONS

WO 2015041207 A1, machine translation, InnovationQ Plus (IP.com). (Year: 2015).*

(Continued)

*Primary Examiner* — Josephine L Chang

(74) *Attorney, Agent, or Firm* — Faegre Drinker Biddle & Reath LLP

(57) ABSTRACT

[Problem] To provide a composition for forming a coating layer having excellent gas barrier performance and a method of forming the coating layer. [Means for Solution] A composition for forming a coating film comprising a specific silicon compound which reacts with a polysilazane by exposure, a polysilazane and an organic solvent, and a method for forming a coating layer comprising coating the composition on a substrate and exposing.

23 Claims, No Drawings

(56) References Cited

FOREIGN PATENT DOCUMENTS

| | | |
|---|---|---|
| JP | H08176512 A | 7/1996 |
| JP | H08325700 A | 12/1996 |
| JP | H10-279362 A | 10/1998 |
| JP | 200026727 A | 1/2000 |
| JP | 2009503157 A | 1/2009 |
| JP | 2010167777 A | 8/2010 |
| JP | 2010190933 A | 9/2010 |
| JP | 2011173057 A | 9/2011 |
| JP | 2011194766 A | 10/2011 |
| JP | 201206154 A | 1/2012 |
| JP | 2012006154 A | 1/2012 |
| JP | 2012106433 A | 6/2012 |
| JP | 2012116101 A | 6/2012 |
| JP | 2012148416 A | 8/2012 |
| KR | 20110012574 A | 2/2011 |
| WO | WO-2009124857 A2 | 10/2009 |
| WO | WO-2012173040 A1 | 12/2012 |
| WO | WO-2015041207 A1 | 3/2015 |

OTHER PUBLICATIONS

International Search Report for PCT/EP2016/000500 dated Aug. 30, 2016.
Written Opinion of the International Searching Authority for PCT/EP2016/000500 dated Aug. 30, 2016.

\* cited by examiner

COMPOSITION FOR FORMING COATING FILM AND METHOD FOR FORMING COATING FILM USING SAME

CROSS-REFERENCE TO RELATED APPLICATIONS

This application is a national stage application (under 35 U.S.C. § 371) of PCT/EP2016/000500, filed Mar. 23, 2016, which claims benefit of Japanese Application No. 2015-086203, filed Apr. 20, 2015, both of which are incorporated herein by reference in their entirety.

BACKGROUND OF THE INVENTION

Technical Field

The present invention relates to a composition for forming a coating film having a high gas barrier performance, which can be used for manufacturing display devices and semiconductor devices, and a method for forming a coating film using same.

Background Art

Silicic films, which are relatively hard and dense, are used in various applications, specifically a hard-coat film, a gas barrier film and a reinforcement film for substrates and circuits and the like in the semiconductor manufacturing industry. Various silicic films for such applications have been investigated.

Of these, methods for forming a coating film having excellent gas barrier performance has been especially investigated. In these methods, a polysilazane is commonly used as a material for coating. For example, Patent Document 1 discloses a method for producing a gas barrier film wherein several gas barrier layers are stacked, Patent Document 2 discloses a gas barrier film wherein a ultraviolet cut layer and a gas barrier layer are formed on both sides of a substrate, and Patent Document 3 discloses a gas barrier film comprising a suppressing bleed-out layer, a ultraviolet cut layer and optionally a fluororesin layer. In all documents disclose that polysilazane materials are used as a part of a gas barrier film.

Patent Document 4 discloses a method for forming a gas barrier film comprising a polysilazane layer containing a catalyst is irradiated with vacuum ultraviolet rays (wavelength 230 nm or less) and ultraviolet rays (wavelength 230 to 300 nm) in the presence of water vapor. Patent Document 5 discloses a method for forming a gas barrier film comprising a composition layer using a polysilazane containing a transition metal is irradiated with vacuum ultraviolet rays (wavelength 230 nm or less) in nitrogen gas atmosphere.

However, according to inventors of the present invention, the coating film formed by using a polysilazane as a main component has often an insufficient gas barrier performance. Thus, a composition which can formed a coating layer having more improved gas barrier performance and a method for forming such coating film have been expected.

PRIOR ART DOCUMENTS

Patent Documents

[Patent document 1] Japanese Unexamined Patent Application Publication No. 2011-173057
[Patent document 2] Japanese Unexamined Patent Application Publication No. 2011-194766
[Patent document 3] Japanese Unexamined Patent Application Publication No. 2012-006154
[Patent document 4] Japanese Unexamined Patent Application Publication (Translation of PCT Application) No. 2009-503157
[Patent document 5] Japanese Unexamined Patent Application Publication No. 2012-148416
[Patent document 6] U.S. Pat. No. 6,329,487

SUMMARY OF THE INVENTION

Problems to be Solved by the Invention

The present invention is made in consideration of such situations and provides a composition for forming a coating layer and a method for forming a coating film, which can form a coating film having excellent gas barrier performance and form such a film easily.

Means for Solving the Problems

A coating composition for forming a coating film of the present invention comprises:
a silicon compound represented by the following formula (1):

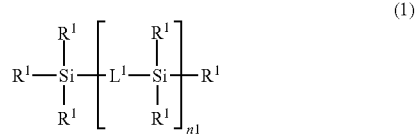

wherein
$R^1$s are monovalent groups independently selected from the group consisting of hydrogen, halogen atom, hydrocarbyl group, hydroxy group, hydroxy hydrocarbyl group, acyl group, acyloxy group, amino group, hydrocarbylamino group, hydrocarbyloxy group, silyl group, hydrocarbylsilyl group, imino group-containing hydrocarbyl group and imino group-containing hydrocarbylamino group, or a divalent hydrocarbon chain or a single bond which may be substituted by a halogen atom, hydroxy group or amino group, where different silicon atoms may be bounded to form a cyclic structure,
$L^1$ is a connecting group selected from single bond, oxy group, imide bond, imino group, carbonyl group, carbonyloxy group and unsaturated bond, and hydrocarbon chain that may contain them, where said connecting group may contain an alicycle, an aromatic ring, or a hetero ring,
n1 is the number indicating degree of polymerization and exceeding 0,
a polysilazane and an organic solvent.

Further, a method for forming a coating film of the present invention, comprising:
(1) coating step, wherein said composition for forming a coating film is coated on a substrate comprising of organic materials to form a composition layer, and
(2) exposure step, wherein said composition layer is exposed to light.

Further, a coating film of the present invention is produced by the above method.

Effects of the Invention

The present invention enables to form a coating film having excellent gas barrier performance easily.

DETAILED DESCRIPTION OF THE INVENTION

Mode for Carrying Out the Invention

Embodiments of the present invention are described below in detail.

Composition for a Coating Film

A composition for a coating film of the present invention comprises a silicon compound, a polysilazane and an organic solvent as essential components, and can comprise other additives if necessary. These components are described below in detail.

Silicon Compound

In the present invention, silicon compound having a certain structure is used. When a composition layer formed by using a composition for forming a coating film of the present invention is exposed, this silicon compound reacts with a polysilazane, described later, to form a cured film. This silicon compound is represented by the formula (1).

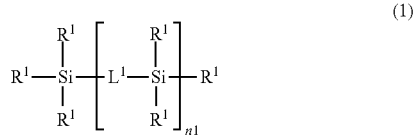
(1)

Wherein $R^1$s are monovalent groups independently selected from the group consisting of hydrogen, a halogen atom, hydrocarbyl group, hydroxy group, hydroxy hydrocarbyl group, acyl group, acyloxy group, amino group, hydrocarbylamino group, hydrocarbyloxy group, silyl group, hydrocarbylsilyl group, imino group-containing hydrocarbyl group and imino group-containing hydrocarbyl amino group, or a divalent hydrocarbon chain or a single bond which may be substituted by a halogen atom, hydroxy group or amino group, where different silicon atoms may be bounded to form a cyclic structure, $L^1$ is a connecting group selected from single bond, oxy group, imide bond, imino group, carbonyl group, carbonyloxy group and unsaturated bond, and hydrocarbon chain that may contain them, where said connecting group may contain an alicycle, an aromatic ring, or a hetero ring, n1 is the number indicating degree of polymerization and exceeding 0.

The silicon compound represented by formula (1) is transformed by exposure step, and then have characteristics of reacting with a polysilazane. Thus, complicated operations are not needed to form a dense film, and also high-temperature treatment which takes energy cost is not needed.

Preferably, the number of hydrogen atoms which are directly bounded to each silicon atom in this silicon compound is small. The most preferable number of silicon atoms depends on a basic structure of a silicon compound. The number of hydrogen atoms bounded to each silicon atom is generally 2 or less, preferably 1 or less.

Of these compounds including components represented by formula (1), the components having excellent properties are described below in detail.

(A) Silicon Compound Having Silicon-Silicon Bond

In a favorable aspect of the silicon compound, it has a structure wherein a silicon atom is bounded directly to a silicon atom. Specifically, $L^1$ is a single bond in formula (1). In this case, hydrocarbyl group contained in a substituted $R^1$ is preferably saturated hydrocarbyl group. More specifically, it is represented by formula (1A).

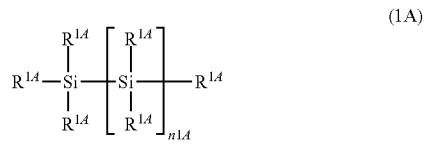
(1A)

Wherein $R^{1A}$s are monovalent groups independently selected from the group consisting of hydrogen, halogen atom, hydroxy group, alkyl group, cycloalkyl group, alkoxy group, aryl group, aralkyl group, acyl group, acyloxy group, alkyl amino group, amino group, silyl group and alkylsilyl group, or $R^{1A}$s are a single bond where different silicon atoms may be bounded to form a cyclic structure, n1A is the number indicating degree of polymerization and exceeding 1.

Here, said $R^{1A}$s are preferably groups independently selected from the group consisting of alkyl group, alkoxy group, silyl group, silylalkyl group and alkylsilyl group. More preferably, said $R^{1A}$s are groups independently selected from the group consisting of alkyl group of 1 to 4 carbon atoms, alkoxy group of 1 to 3 carbon atoms and alkylsilyl group of 1 to 3 carbon atoms. Especially preferably, $R^{1A}$s are independently selected from the group consisting of methyl group, ethyl group, t-butyl group, trimethylsilyl group, methoxy group and ethoxy group.

Further, the silicon compound represented by formula (1A) may have a cyclic structure comprised of silicon atoms. Thus, $R^{1A}$ bounded to a silicon atom may be the same single bond as $R^{1A}$ which is bounded to other silicon atom. In this case, this silicon compound is cyclopolysilane.

As this compound has silicon-silicon bond, n1A is one or more. When this compound has a chain structure, n1A is preferably 10 or less, more preferably 6 or less, most preferably 2 or less. When this compound has a cyclic structure, n1A is 3 or more, preferably 5 or more, more preferably 6 or more, and preferably 10 or less.

Preferably, the number of hydrogen atoms which are directly bounded to each silicon atom is less in this compound. In specific, when the silicon compound represented by formula (1A) has a chain structure, the number of hydrogen atoms bounded to each silicon atom is preferably 1 or less, more preferably 0. When the silicon compound represented by formula (1A) has a cyclic structure, the number of hydrogen atoms bounded to each silicon atom is preferably 2 or less, more preferably 1 or less.

(B) Silicon Compound Having an Ethylene Bond or an Acetylene Bond

In a favorable other aspect of the silicon compound, it contains an ethylene bond or an acetylene bond in the molecule. In specific, at least one of $R^1$ or $L^1$ in the formula (1) contains an ethylene bond or an acetylene bond. Then, silicon compound in the molecule is preferably bounded directly to hydrogen atom. More specifically, it is represented by the formula (1B).

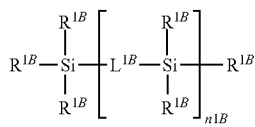

(1B)

Wherein
$R^{1B}$s are monovalent groups independently selected from the group consisting of alkyl group, cycloalkyl group, aryl group, aryloxy group, heteroaryl group, aralkyl group, alkenyl group, alkynyl group, hydroxy group, hydroxyalkyl group, hydroxyalkenyl group, acyl group, acyloxy group, alkylamino group, alkyloxy group, silyl group and alkylsilyl group,
$L^{1B}$ is a connecting group selected from single bond, oxy group, imide bond, imino group, carbonyl group, carbonyloxy group and unsaturated bond, and hydrocarbon chain that may contain them, and
n1B is the number indicating degree of polymerization and exceeding 0.

At least one of $R^{1B}$ and $L^{1B}$ contains an ethylene bond or an acetylene bond.

These ethylene bond or acetylene bond may be contained in any form in the molecule. In a favorable embodiment, at least one $L^{1B}$ contains an ethylene bond or an acetylene bond. Then, $L^{1B}$ itself may be the ethylene bond or acetylene bond, or a bond further hydrocarbon chain bounded to them, for example propenylene group (—$CH_2$—CH=CH—).

The monovalent group $R^{1B}$ may contain an ethylene bond or an acetylene bond. In specific, at least one $R^{1B}$ is selected from the group consisting of ethynyl group, which can be referred to as acetylene group, and vinyl group. Preferably, $L^{1B}$ is selected from the group consisting of single bond, oxy group and imino group, and at least one $R^{1B}$ is a monovalent group selected from the group consisting of ethynyl group and vinyl group.

Preferably, the silicon compound represented by the formula (1B) has a mass-average molecular weight of 50 to 200,000. Here, the mass-average molecular weight means the mass-average molecular weight in terms of polystyrene.

One silicon compound preferably contains 2 or more ethylene bonds or acetylene bonds. In specific, n1B is 1 or more, the silicon compound is oligomer or polymer, $L^{1B}$ is oxy group or imino group, and two $R^{1B}$ at both terminals contain respectively an ethylene bond or an acetylene bond.

(C) Silicon Compound Wherein Silicon Atoms are Bounded Through Alkylene Group or Arylene Group In a favorable other aspect of the silicon compound, silicon atoms are bounded through alkylene group or arylene group. In specific, $L^1$ in the formula (1) is alkylene group or arylene group. Then, $L^1$ and $R^1$ do not contain ethylene bond or acetylene bond, and may contain oxy group. Preferably, silicon compound in the molecule is not bounded to hydrogen atom. More specifically, it is represented by the formula (1C).

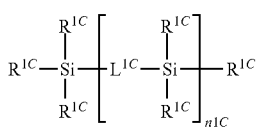

(1C)

Wherein
$R^{1C}$s are monovalent groups independently selected from the group consisting of alkyl group, cycloalkyl group, heterocycloalkyl group, aryl group, heteroaryl group, arylamino group, hydroxy group, hydroxyalkyl group, acyl group, acyloxy group, amino group, alkylamino group, alkyloxy group, silyl group and alkylsilyl group, $L^{1C}$ is a connecting group selected from alkylene group and arylene group that may contain oxy group, and
n1C is the number indicating degree of polymerization and exceeding 1.

None of $R^{1C}$s and $L^{1C}$ contains an ethylene bond or an acetylene bond. A conjugated bond contained in aromatic compound is excluded from the ethylene bond.

In the silicon compound represented by the formula (1C), $L^{1C}$ may contain oxy group. In specific, $L^{1C}$ is preferably selected from the group consisting of hydrocarbyl group, oxy group-containing hydrocarbyl group, hydrocarbylenedioxy group and hydrocarbyleneetherdioxy group. Then, $L^{1C}$ is preferably selected from the group consisting of 1,2-ethanedioxy group, 1,4-butanedioxy group, 1,6-hexanedioxy group, 1,4-cyclohexanedioxy group, bis(2-oxyethyl) ether group, ethylene group, tetramethylene group, hexamethylene group and phenylene group.

In the silicon compound represented by the formula (1C), n1C is preferably 1.

(D) Monosilane Compound Completely Substituted with Bulky Hydrocarbyl Group

In a favorable other aspect of the silicon compound, it is a monosilane compound containing only one silicon atom, and its bounded substituent is hydrocarbyl group or hydrocarbylamino group. The total number of carbon atoms and nitrogen atoms in the whole compound is 8 or more. More specifically, it is represented by the formula (1D).

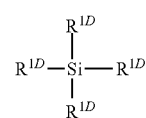

(1D)

Wherein
$R^{1D}$s are monovalent groups independently selected from the group consisting of alkyl group, aryl group, alkylamino group, arylamino group, imino group-containing alkyl group and imino group-containing alkylamino group,
where the number of hydrogen atom bounded to each silicon atom is 1 or less and the total number of carbon atoms and nitrogen atoms contained in all $R^{1D}$ is 8 or more.

In this silicon compound, the total number of contained carbon atoms and nitrogen atoms is not limited unless it impairs the effect of the present invention. The total number is generally 48 or less, preferably 40 or less.

In specific, $R^{1D}$ is selected from the group consisting of alkyl group of 1 to 10 carbon atoms, aryl group of 6 to 12 carbon atoms, alkylamino group of 1 to 10 carbon atoms, arylamino group of 6 to 12 carbon atoms, imino group-containing alkyl group of 1 to 10 carbon atoms and imino group-containing alkyl group of 1 to 10 carbon atoms.

Polysilazane

A polysilazane used for the composition for forming a coating composition of the present invention is not limited, but it typically has a structure unit represented by the formula (2).

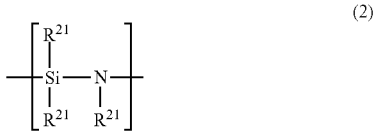

(2)

R²¹'s are groups independently selected from the group consisting of hydrogen atom, alkyl group, alkenyl group, cycloalkyl group, aryl group, alkoxy group, amino group and silyl group. When $R^{21}$ is a group except the hydrogen atom, it may be substituted by one or more groups selected from the group consisting of halogen atom, alkyl group, alkoxy group, amino group, silyl group and alkylsilyl group. The $R^{21}$ which has such substituents include fluoroalkyl group, perfluoroalkyl group, silylalkyl group, trisilylalkyl group, alkylsilylalkyl group, trialkylsilyl group, alkoxysilylalkyl group, fluoroalkoxy group, silylalkoxy group, alkylamino group, dialkylamino group, alkylaminoalkyl group, alkylsilyl group, dialkylsilyl group, alkoxysilyl group, dialkoxysilyl group and trialkoxysilyl group. Preferably, said $R^{21}$ is independently selected from the group consisting of (a) hydrogen, (b) alkyl group such as methyl group, ethyl group and propyl group, (c) alkenyl group such as vinyl group and allyl group, (d) aryl group such as phenyl group, (e) alkylsilyl group such as trimethylsilyl and (f) alkoxysilylalkyl group such as triethoxysilylpropyl group.

The polysilazane mainly containing the structure unit represented by the formula (2) has a straight chain structure. However, polysilazane having other structure, that is a branched chain structure or a cyclic structure, can be used. Such polysilazane contains following formulae.

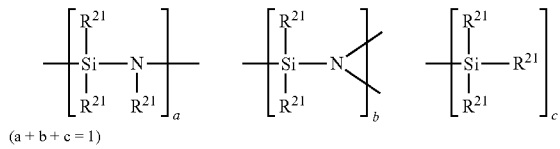

(a + b + c = 1)

The polysilazane represented by above formulae are largely classified into organopolysilazane wherein $R^{21}$ contains organic group and perhydropolysilazane wherein all $R^{21}$'s are hydrogen atoms. These polysilazane can be produced by any method known conventionally.

Further, a metallopolysilazane wherein part of it is modified by a metallic compound, a boron-containing polysilazane, and polysiloxazane containing a silicone structure can be used. In the present invention, a polysilazane including a modified polysilazane is referred to as a polysilazane, for convenience. In the present invention, these polysilazane can be used in combination of two or more kinds.

The molecular weight of the polysilazane used for the present invention is not limited, but for example mass-average molecular weight of the polysilazane in terms of polystyrene is preferably 500 to 20,000, more preferably 1,000 to 10,000.

Organic Solvent

The composition for a coating film used in the present invention contains a solvent capable of dissolving said silicon compound and said polysilazane. Such a solvent is not limited and can be freely selected as long as it can dissolve the above components.

Preferred examples of the solvent include:
(a) aromatic compounds, such as benzene, toluene, xylene, ethylbenzene, diethylbenzene, trimethylbenzene, triethylbenzene and tetrahydronaphthalene;
(b) saturated hydrocarbon compounds, such as n-pentane, i-pentane, n-hexane, i-hexane, n-heptane, i-heptane, n-octane, i-octane, n-nonane, i-nonane, n-decane and i-decane;
(c) alicyclic hydrocarbon compounds, such as ethylcyclohexane, methylcyclohexane, cyclohexane, cyclohexene, p-menthane, decahydronaphthalene, dipentene and limonene;
(d) alkylethers, such as dipropyl ether, dibutyl ether, diethyl ether, dipentyl ether, dihexyl ether, methyl tertiary butyl ether (hereinafter, referred to as MTBE) and anisole; and
(e) ketones, such as methyl isobutyl ketone (hereinafter, referred to as MIBK).

Among them, preferred are (a) aromatic compounds, (b) saturated hydrocarbon compounds, (c) alicyclic hydrocarbon compounds and (d) alkylethers, more preferably xylene and dibutyl ether.

These solvents can be used in combination of two or more to control the evaporation rate, to reduce the hazardousness to the human body and to control the solubility of the components.

Commercially available solvents can be adopted as these solvents. Examples include: Pegasol 3040, Exxsol D30, Exxsol D40, Exxsol D80, Solvesso 100, Solvesso 150, Isopar H, Isopar L (trade name, manufactured by Exxon Mobil Corporation), New Solvent A, Cactus Fine-01, Cactus Fine SF-02 (trade name, manufactured by JX Nippon Oil & Energy Co.), Shellsol MC311, Shellsol MC811, Sol Eight Deluxe, New Shell Bright Sol (trade name, manufactured by Shell Chemicals Japan Ltd.). If a mixture of solvents is adopted in the present invention, the mixture preferably contains aromatic hydrocarbons in an amount of 30 mass % or less based on the total weight of the mixture so as to reduce the hazardousness to the human body.

Other Components

In the present invention, the composition for forming a coating film can contain an amine compound and a metal complex compound. These compounds function as a catalyst for use in curing reaction of applied composition on a substrate.

It is possible to use one of the optional as an amine compound, but may be suitably, for example, aliphatic amines, aromatic amines or heterocyclic amines. Aliphatic amines or aromatic amines may be any of primary amines, secondary amines or tertiary amines. Further, these may have any number of nitrogen atoms such as monoamine, diamine, or triamine. Examples of heterocyclic amines include a compound comprising pyrrole ring, pyridine ring, pyrazine ring, pyrimidine ring or triazole ring. Also, these amine compounds are optionally substituted by freely-selected substituent, for example, a group selected from the group consisting of alkoxy group, alkylene group, silyl group and alkylsilyl group.

Preferred examples of an amine compound include:
dipropylamine, diisopropylamine, tripropylamine, butylamine, dibutylamine, tributylamine, isobutylamine, diisobutylamine, tert-butylamine, pentylamine, tripentylaminehexylamine, N-methylhexylamine, N,N-dimethylhexylamine, N,N-dimethyl-2-ethylhexylamine, heptylamine, octylamine, di-n-octylamine N-methyl di-n-octylamine, tri-n-octylamine, N,N,N',N-tetramethyldiaminomethane, N,N'-dimethylethylenediamine, N,N,N',N'-tetramethylethylenediamine, N,N,N',N'-tetramethyl-1,3-propanediamine, N,N,N',N'-tetramethyl-1,4-butanediamine, N,N-di-tertbutylethylenediamine, N,N,N',N'-tetramethylhexamethylenediamine, N,N,N',N'-tetramethyl-1,8-octanediamine, allylamine, diallylamine, triallylamine, N-methyldiallylamine, N,N-dimethylallylamine, benzylamine, dibenzylamine, N-methylbenzylamine, N,N-dimethylbenzylamine, pyrrol, pyrroline, pyridine, picoline, lutidine, pyrazine, aminopyridine, aminomethylpyridine, phenylpyridine, vinylpyridine, aminopyrazine, 2-methoxyethylamine, 3-methoxypropylamine, 3-ethoxypropylamine, 3-propoxypropylamine, 3-isopropoxypropylamine, 3-butoxypropylamine, bis(2-aminoethylether), bis(3-aminopropylether), 3-(2-dimethylaminoethoxy)propylamine, hexamethyldisilazane, tetramethyldisilazane and heptamethyldisilazane.

An amine compound is not limited unless it impairs the effects of the present invention. However it should be noted that using alcohols or some N-heterocyclic amines may cause increase Si—O bonds during curing reaction.

A metal complex compound is also freely-selected as long as it accelerates curing reaction of a coated film. Preferred examples of the metal are selected from the group consisting of nickel, titanium, platinum, rhodium, cobalt, iron, iridium, aluminum, ruthenium, palladium, rhenium and tungsten. Further, it is preferable to comprise a ligand selected from the group consisting of acetylacetonato group, carbonyl group or carboxylate group. The carboxylate group is preferably a residue of carboxylic acid selected from the group consisting of formic acid, acetic acid, propionic acid, butyric acid, octane acid, lauric acid, stearic acid, oleic acid, lactic acid, succinic acid and citric acid.

Preferred example of the metal complex compound include: tris(acetylacetonato)aluminium, tris(acetylacetonato)iron, tris(acetylacetonato)rhodium, tris(acetylacetonato)cobalt, tris(acetylacetonato)rhthenium, bis(acetylacetonato)palladium, hexacarbonyltungsten, dodecacarbonyltrirhthenium, dodecacarbonylrhenium, palladium acetate, nickel benzoate, nickel octoate, nickel oleate, iron formate, cobalt benzoate, cobalt citrate, cobalt formate, rhodium acetate(III), rhodium acetate(II), titanium oleate, aluminum gluconate, aluminum benzoate, and aluminum butyrate.

The composition used in the present invention can optionally contain other additives. Examples of the optional additives include crosslinking accelerators and viscosity modifiers. Further, the composition can contain a phosphorus compound, for example tris(trimethyl-silyl)phosphate, for the sake of Na-gettering effect in the semiconductor manufacturing process.

Composition for Forming a Coating Film

Said silicon compound, said polysilazane and, if necessary, other additives are dissolved or dispersed in the above solvent to prepare the composition for a coating film in the present invention. In this preparation, there are no particular restrictions on the order of dissolving the components in the solvent. Further, the solvent can be replaced after the components are made to react.

The contained amount of each component depends on the application of the composition. Compounding ratio of silicon compound to polysilazane can be adjusted properly for the application. Generally, high compounding ratio of silicon compound is preferable to obtain high gas barrier performance. Thus, the compounding amount of the silicon compound is preferably 0.01 parts or more by mass, more preferably 0.1 parts or more by mass, per polysilazane 100 parts by mass. Low compounding ratio of silicon compound is preferable to promote a curing reaction of a formed coating. Thus, the compounding amount of the silicon compound is preferably 25 parts or less by mass, more preferably 8 parts or less by mass, per polysilazane 100 parts by mass.

To achieve adequate film thickness, the content of the polymer component consisting of silicon compound and polysilazane is preferably 0.1 to 40 mass %, more preferably 0.1 to 40 mass %, and further preferably 0.1 to 30 mass %. When the composition comprises the amine compound, the content of the amine compound is preferably more than a certain amount to accelerate adequate curing reaction and less than a certain amount to maintain storage stability of the composition. Thus, the content of the amine compound is preferably 0.005 to 1.00 mmol per 1 g polymer, more preferably 0.01 to 0.60 mmol. When the composition comprises the metal complex compound, the content of the metal complex compound is preferably more than a certain amount to accelerate adequate curing reaction and less than a certain amount to maintain storage stability of the composition. Thus, the content of the metal complex compound is preferably 0.002 to 0.50 mmol per 1 g polymer, more preferably 0.005 to 0.20 mmol.

Method for Forming a Coating Layer

A method for forming a coating film of the present invention comprises:

(1) coating step, wherein said composition for forming a coating film is coated on a substrate to form a composition layer, and (2) exposure step, wherein said composition layer is exposed to light.

The substrate which is coated by a composition for forming a coating film is not limited and can be freely selected from metallic materials, ceramics and organic materials. Forming a coating on a surface of a substrate comprising organic materials is preferable to obtain a film material having excellent gas barrier performance since a coating film formed by a method of the present invention has excellent gas barrier performance. Plastic film such as polyethylene naphthalate, polyethylene terephthalate, polystyrene, polypropylene, polyethylene, polyimide, polyamide, cellulose acetate, acrylic, polycarbonate and vinyl chloride is preferable as those organic materials. Of these, polyethylene naphthalate or polyethylene terephthalate is particularly preferable in terms of heat resistance and transparency.

Coating film is formed not only on one side of a substrate, but also, if necessary, on both sides of a substrate. In that case, a substrate is needed to be selected according to the aim.

In the coating step (1), said composition for forming a coating film is coated on a surface of said substrate. In the method for forming a coating film, the composition for forming a coating film is coated on a surface of one side or both sides. Silicon oxide or silicon nitride layer can be formed on the surface of the substrate before the composition for forming a coating film is applied. These coating layers can be formed by a CVD method, a PVD method such as sputtering or an ALD method.

A known coating method for applying a composition on a substrate can be adapted, such as spin coating, dip coating, spray coating, roll coating, print-transfer coating, slit coating, bar coating and the like. Thickness of a composition layer is preferred to be enough thick in order to show gas barrier performance. Specifically, the thickness is preferably 10 nm or more, more preferably 50 nm or more. Further, thickness of a composition layer after coating is preferred to be set in order to cure efficiently in the manner described later. Specifically, the thickness is preferably 900 nm or less, more preferably 500 nm or less. When coating layers films are formed on both sides of a substrate, it can be coated sequentially one side by one, or simultaneously on both sides.

The composition layer formed on a substrate surface is then optionally dried to remove excess solvent. Particularly in the exposure step wherein relatively short-wavelength light is used, described in detail later, organic solvent which is likely to absorb short-wavelength light is preferred to be removed as much as possible. In this step, if the coated film is dried at relatively high temperature, the solvent can be efficiently removed.

The coated film can also be dried under reduced pressure. Specifically, negative pressure can be applied to the coated substrate by means of for example a vacuum pump, a rotary pump, so as to accelerate evaporation of the solvent in the coated film and thereby to promote the drying.

The coated film, from which is removed excess solvent by drying, may be optionally blown by an inert gas such as nitrogen. This process can remove adhered-matter on the surface of the coated film and enhance efficiency of light irradiation. Furthermore, it is possible to remove, for example, solvent on the surface by infrared-ray irradiation.

Subsequently, thus obtained composition layer is subjected to a exposure step. The conditions of light irradiation in the exposure step are properly selected according to the thickness, composition, hardness and the like of the aimed coating film.

As light sources in the exposure step, any light sources can be used, for example ultraviolet light and visible light. Further, electron beam and plasma can be used as light in the present invention. The maximum peak wavelength is preferably 161 to 248 nm, more preferably 165 to 180 nm. As light sources for the irradiation, any light sources, typically Xenon excimer laser, can be used as long as it emits light of said specific wavelength. Dispersed light by a filter or a spectrometer with a lamp which emit light having wide-range wavelength also can be used.

In the method for forming a coating film of the present invention, said silicon compound is transformed to react with polysilazane by this exposure step. As the curing part of the composition layer in depth direction is depending on the wavelength of light irradiation, irradiation light can be selected according to a purpose. Specifically, the curing part of the composition layer is deeper by irradiation of long wavelength light, and the curing part of the composition layer is shallower by irradiation of short wavelength light.

The atmosphere of the light irradiation is freely selected according to the components and the aimed coating film, but the light irradiation is preferably carried out in an atmosphere wherein oxygen does not permeate into the film, briefly in a low oxygen content atmosphere. Specifically, oxygen content in the atmosphere is preferably 1,000 ppm or less, more preferably 100 ppm or less. To satisfy such conditions, the light irradiation can be carried out in vacuum or under reduced pressure, or in an inert gas atmosphere. Further, it is also effective that, after the atmosphere is evacuated to reduce the pressure, an inert gas is introduced and then the light irradiation is carried out therein. Examples of the inert gas include nitrogen, argon, helium and mixed gases thereof. Nitrogen is preferably used from the viewpoint of handling properties.

The nitrogen gas used here is inert enough not to be permeated in the coating film and accordingly not to increase the nitrogen content of the film. The light irradiation is not necessarily carried out in an airtight chamber, and may be performed in a flow of inert gas. Further, the light irradiation can be carried out in a mixture of inert gas with, for example, ammonia or dinitrogen monoxide. In that case, as ammonia or dinitrogen monoxide can be served as a nitrogen source of Si—N bonds of the coating film, gas barrier performance can be improved by using them.

In the exposure step, the composition layer can be heated during the light irradiation. This heating can accelerate the curing reaction additionally. The composition layer can be heated after the exposure step to accelerate the curing reaction. The heating method is not limited and can be freely selected from a method of heating a stage where a substrate is placed, a method of heating atmosphere, and the like. However, when organic material is used as a substrate, the heating temperature is preferably low. That is because too high heating temperature may damage the substrate. Specifically, the temperature while the composition layer is cured to form a coating film is preferably 200° C. or less.

Thus formed gas barrier film is excellent in gas barrier performance, thermal stability and transparency, and hence can be used as a gas barrier film in a semiconductor device, a protective film or an insulating film The present invention is further explained below by use of the following examples.

Preparation of Composition for Forming a Coating Film

Various kinds of silicon compounds and perhydropolysilazane were prepared. Perhydropolysilazane was synthesized from dichlorosilane as a raw material according to a method disclosed by patent document 6 and the like.

20 g perhydropolysilazane and 60 g dibutyl ether were introduced in a glass beaker of capacity 500 ml and mixed to obtain a polysilazane solution. Prescribed amount of silicon compound and dibutyl ether were introduced in other glass beaker of capacity 50 ml and mixed to obtain 20 g solution in total amount. Obtained silicon compound solution was added to the polysilazane solution and performed bubbling agitation by blowing dry nitrogen for 3 minutes to prepare a compound for forming a coating film. Then, it was diluted by dibutyl ether to obtain aimed film thickness.

Formation of Gas Barrier Film

The prepared composition for forming a coating film was coated on a polyethylene naphthalate film of thickness 125 μm using a spin coater and then dried. Subsequently, the coated film was placed into an exposure apparatus, wherein nitrogen was introduced and oxygen concentration was equal to or less than 100 ppm, and irradiated with light having maximal peak 172 nm wavelength to obtain a coating film after 30 minutes exposure treatment. The irradiance was 8 mW/cm$^2$. The irradiance was measured by Accumulated UV Meter UIT-250 and Detector VUV-S172 (both trade names, manufactured by USHIO INC.).

Evaluation a moisture permeability of the film before coating and the film with coating obtained by the above method was measured at 40° C., relative humidity of 90% by using DEL-TAPERM-UH gas permeation measuring apparatus (Technolox Ltd). The moisture permeability of the film before coating was 1 g/m$^2$/day. The thickness of coated films was measured by an ellipsometer. Thickness of all films was about 200 nm. The results were shown in Table 1 to 4.

TABLE 1

| silicon compound | poly-silazane:silicon compound ratio | Water vapor transmission rate g/m²/day |
|---|---|---|
| Example A01 (1A-1) hexamethyldisilane | 100:1 | 6.1 × 10⁻³ |
| Example A02 (1A-1) hexamethyldisilane | 100:5 | 5.3 × 10⁻³ |
| Example A03 (1A-2) tetrakis (trimethylsilyl) silane | 100:1 | 6.6 × 10⁻³ |
| Example A04 (1A-2) tetrakis (trimethylsilyl) silane | 100:5 | 7.0 × 10⁻³ |
| Example A05 (1A-3) 2,2-di-t-butyl-1,1,1,3,3,3-hexamethyltrisiliane | 100:1 | 5.5 × 10⁻³ |
| Example A06 (1A-3) 2,2-di-t-butyl-1,1,1,3,3,3-hexamethyltrisilane | 100:5 | 7.2 × 10⁻³ |
| Example A07 (1A-4) decamethyltetrasilane | 100:1 | 6.1 × 10⁻³ |
| Example A08 (1A-4) decamethyltetrasilane | 100:5 | 7.1 × 10⁻³ |
| Example A09 (1A-5) 1,2-diethoxy-1,1,2,2-tetramethyldisilane | 100:1 | 5.2 × 10⁻³ |
| Example A10 (1A-5) 1,2-diethoxy-1,1,2,2-tetramethyldisilane | 100:5 | 4.8 × 10⁻³ |
| Example A11 (1A-6) hexaethyldisilane | 100:1 | 6.5 × 10⁻³ |
| Example A12 (1A-6) hexaethyldisilane | 100:5 | 7.3 × 10⁻³ |
| Comparative Example A01 | — | 100:0 | 4.7 × 10⁻² |

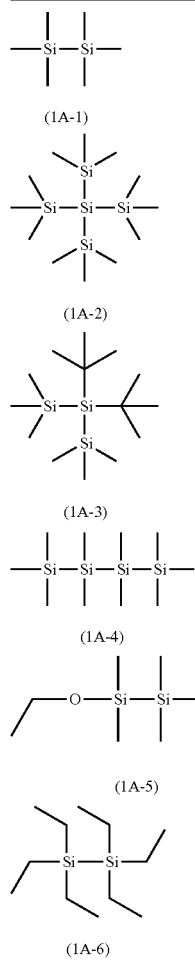

TABLE 2

| silicon compound | poly-silazane:silicon compound ratio | water vapor transmission rate g/m²/day |
|---|---|---|
| Example B01 (1B-1) bistrimethylsilylacethylene | 100:2 | 6.5 × 10⁻³ |
| Example B02 (1B-1) bistrimethylsilylacethylene | 100:5 | 6.0 × 10⁻³ |
| Example B03 (1B-2) triethylsilylacethylene | 100:2 | 5.9 × 10⁻³ |
| Example B04 (1B-2) triethylsilylacethylene | 100:5 | 4.0 × 10⁻³ |

TABLE 2-continued

| silicon compound | | poly-silazane:silicon compound ratio | water vapor transmission rate g/m²/day |
|---|---|---|---|
| Example B05 | (1B-3) trietylvinylsilane | 100:2 | $7.1 \times 10^{-3}$ |
| Example B06 | (1B-3) trietylvinylsilane | 100:5 | $5.5 \times 10^{-3}$ |
| Example B07 | (1B-4) 1,3-divinyltetramethyldisiloxane | 100:2 | $6.2 \times 10^{-3}$ |
| Example B08 | (1B-4) 1,3-divinyltetramethyldisiloxane | 100:5 | $7.3 \times 10^{-3}$ |
| Example B09 | (1B-5) 1,3-divinyl-1,1,3,3-tetramethyldisilazane | 100:2 | $6.3 \times 10^{-3}$ |
| Example B10 | (1B-5) 1,3-divinyl-1,1,3,3-tetramethyldisilazane | 100:5 | $7.1 \times 10^{-3}$ |
| Example B11 | (1B-6) diallyldiphenylsilane | 100:2 | $7.3 \times 10^{-3}$ |
| Example B12 | (1B-6) diallyldiphenylsilane | 100:5 | $8.0 \times 10^{-3}$ |
| Example B13 | (1B-7) triphenoxyvinylsilane | 100:2 | $7.4 \times 10^{-3}$ |
| Example B14 | (1B-7) triphenoxyvinylsilane | 100:5 | $8.3 \times 10^{-3}$ |
| Example B15 | (1B-8) (pentamethyldisilyl)acethylene | 100:2 | $4.5 \times 10^{-3}$ |
| Example B16 | (1B-8) (pentamethyldisilyl)acethylene | 100:5 | $5.0 \times 10^{-3}$ |
| Example B17 | (1B-9) (1-hydroxy-allyl)trimethylsilane | 100:2 | $6.3 \times 10^{-3}$ |
| Example B18 | (1B-9) (1-hydroxy-allyl)trimethylsilane | 100:5 | $7.2 \times 10^{-3}$ |
| Example B19 | (1B-10) terminal-vinylated polydimethylsiloxane molecular weight 9,400 | 100:2 | $6.3 \times 10^{-3}$ |
| Example B20 | (1B-10) terminal-vinylated polydimethylsiloxane molecular weight 9,400 | 100:5 | $5.3 \times 10^{-3}$ |
| Example B21 | (1B-10) terminal-vinylated polydimethylsiloxane molecular weight 62,700 | 100:2 | $6.6 \times 10^{-3}$ |
| Example B22 | (1B-10) terminal-vinylated polydimethylsiloxane molecular weight 62,700 | 100:5 | $6.1 \times 10^{-3}$ |
| Example B23 | (1B-10) terminal-vinylated polydimethylsiloxane molecular weight 155,000 | 100:2 | $7.4 \times 10^{-3}$ |
| Example B24 | (1B-10) terminal-vinylated polydimethylsiloxane molecular weight 155,000 | 100:5 | $8.2 \times 10^{-3}$ |
| Comparative Example A01 | — | 100:0 | $4.7 \times 10^{-2}$ |

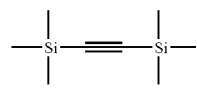

(1B-1)

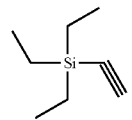

(1B-2)

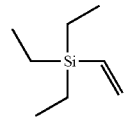

(1B-3)

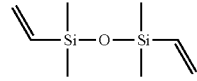

(1B-4)

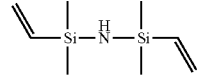

(1B-5)

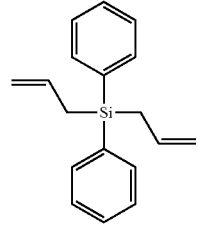

(1B-6)

TABLE 2-continued

| silicon compound | polysilazane:silicon compound ratio | water vapor transmission rate g/m²/day |
|---|---|---|

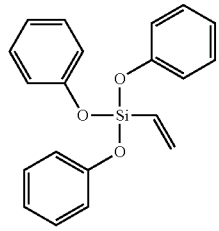

(1B-7)

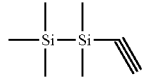

(1B-8)

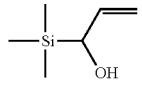

(1B-9)

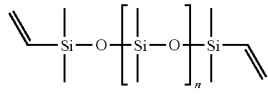

(1B-10)

TABLE 3

| silicon compound | polysilazane:silicon compound ratio | water vapor transmission rate g/m²/day |
|---|---|---|
| Example C01 (1C-1) ethylenedeioxybis (trimethylsilane) | 100:2 | $5.2 \times 10^{-3}$ |
| Example C02 (1C-1) ethylenedeioxybis (trimethylsilane) | 100:5 | $5.5 \times 10^{-3}$ |
| Example C03 (1C-2) 1,2-bis[(dimethylamino)dimethylsilyl]ethane | 100:2 | $5.2 \times 10^{-3}$ |
| Example C04 (1C-2) 1,2-bis[(dimethylamino)dimethylsilyl]ethane | 100:5 | $6.5 \times 10^{-3}$ |
| Example C05 (1C-3) bis[2-(trimethylsiloxy)ethyl]ether | 100:2 | $4.5 \times 10^{-3}$ |
| Example C06 (1C-3) bis[2-(trimethylsiloxy)ethyl]ether | 100:5 | $5.0 \times 10^{-3}$ |
| Example C07 (1C-4) tetramethylenebis(trimethylsilane) | 100:2 | $4.4 \times 10^{-3}$ |
| Example C08 (1C-4) tetramethylenebis(trimethylsilane) | 100:5 | $5.5 \times 10^{-3}$ |
| Example C09 (1C-5) 1,1,1,8,8,8-hexakis(trimethylsilyl)-1,8-disilaoctane | 100:2 | $6.4 \times 10^{-3}$ |
| Example C10 (1C-5) 1,1,1,8,8,8-hexakis(trimethylsilyl)-1,8-disilaoctane | 100:5 | $7.5 \times 10^{-3}$ |
| Example C11 (1C-6) 1,4-bis(3-aminopropyldimethylsilyl)benzen | 100:2 | $6.4 \times 10^{-3}$ |
| Exampel C12 (1C-6) 1,4-bis(3-aminopropyldimethylsilyl)benzen | 100:5 | $7.6 \times 10^{-3}$ |
| Example C13 (1C-7) methylenebis[dimethyl(1-pyridyl)silane] | 100:2 | $5.8 \times 10^{-3}$ |
| Example C14 (1C-7) methylenebis[dimethyl(2-pyridyl)silane] | 100:5 | $5.4 \times 10^{-3}$ |
| Comparative Example A01 | — | 100:0 | $4.7 \times 10^{-2}$ |

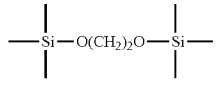

(1C-1)

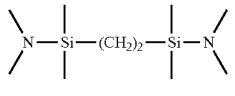

(1C-2)

TABLE 3-continued

| silicon compound | poly-silazane:silicon compound ratio | water vapor transmission rate g/m²/day |
|---|---|---|

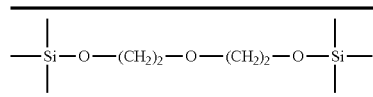

(1C-3)

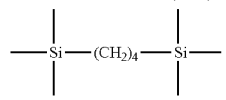

(1C-4)

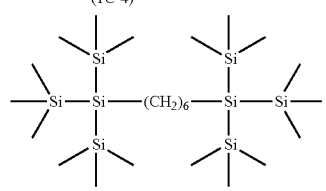

(1C-5)

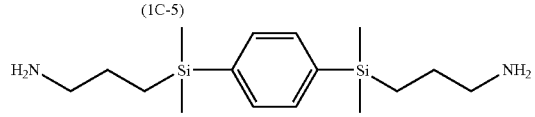

(1C-6)

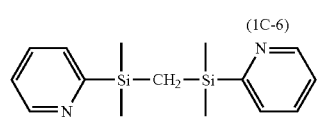

(1C-7)

TABLE 4

| silicon compound | poly-silazane:silicon compound ratio | water vapor transmission rate g/m²/day |
|---|---|---|
| Example D01 (1D-1) t-butyldiphenylsilane | 100:2 | $5.6 \times 10^{-3}$ |
| Example D02 (1D-1) t-butyldiphenylsilane | 100:5 | $6.2 \times 10^{-3}$ |
| Example D03 (1D-2) tetraethylsilane | 100:2 | $4.8 \times 10^{-3}$ |
| Example D04 (1D-2) tetraethylsilane | 100:5 | $5.3 \times 10^{-3}$ |
| Example D05 (1D-3) tetraoctylsilane | 100:2 | $6.2 \times 10^{-3}$ |
| Example D06 (1D-3) tetroctylsilane | 100:5 | $7.1 \times 10^{-3}$ |
| Example D07 (1D-4) 2-aminoethylaminomethyldimethylphenylsilane | 100:2 | $5.1 \times 10^{-3}$ |
| Example D08 (1D-4) 2-aminoethylaminomethyldimethylphenylsilane | 100:5 | $5.5 \times 10^{-3}$ |
| Comparative Example A01 | — | 100:0 | $4.7 \times 10^{-2}$ |

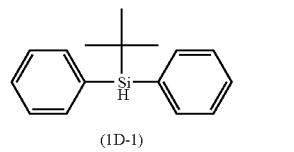

(1D-1)

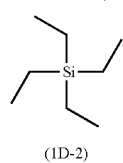

(1D-2)

TABLE 4-continued

| silicon compound | poly-silazane:silicon compound ratio | water vapor transmission rate g/m²/day |
|---|---|---|

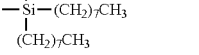

The invention claimed is:

1. A composition for forming a coating film, comprising:
a silicon compound represented by the following formula (1):

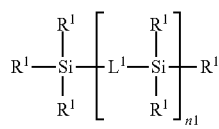
(1)

wherein
R¹s are monovalent groups independently selected from the group consisting of hydrogen, halogen atom, hydrocarbyl group, hydroxy group, hydroxy hydrocarbyl group, acyl group, acyloxy group, amino group, hydrocarbylamino group, hydrocarbyloxy group, silyl group, hydrocarbylsilyl group, imino group-containing hydrocarbyl group and imino group-containing hydrocarbylamino group, or a divalent hydrocarbon chain or a single bond which is unsubstituted or substituted by a halogen atom, hydroxy group or amino group, where different silicon atoms are unbound or bound to form a cyclic structure, L¹ is a connecting group selected from single bond, oxy group, imide bond, imino group, carbonyl group, carbonyloxy group and unsaturated bond, and hydrocarbon chain that may contain them, where said connecting group may contain an alicycle, an aromatic ring, or a hetero ring, n1 is the number indicating degree of polymerization and exceeding 0, a polysilazane represented by the formula (2)

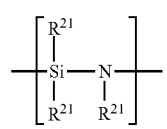
(2)

wherein each R²¹ is hydrogen, and
which has a mass average molecular weight 1,000 to 10,000 and
an organic solvent and wherein 0.1 to 8 parts by mass of said silicon compound is contained per 100 parts by mass of said polysilazane.

2. The composition for forming a coating film according to claim 1, wherein said organic solvent comprises one or more kinds of solvent that is aromatic hydrocarbon, saturated hydrocarbon compound, alicyclic hydrocarbon and alkylether.

3. The composition for forming a coating film according to claim 1, wherein said silicon compound is represented by the following formula (1A):

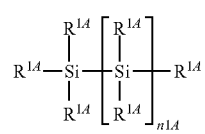
(1A)

wherein
R¹ᴬs are monovalent groups independently selected from the group consisting of hydrogen, halogen atom, hydroxy group, alkyl group, cycloalkyl group, alkoxy group, aryl group, aralkyl group, acyl group, acyloxy group, alkyl amino group, amino group, silyl group and alkylsilyl group, or R¹ᴬs are a single bond where different silicon atoms are unbound or bound to form a cyclic structure and n1A is the number indicating degree of polymerization and exceeding 1.

4. The composition for forming a coating film according to claim 3, wherein said R¹ᴬs are groups independently selected from the group consisting of alkyl group, alkoxy group, silyl group, silylalkyl group and alkylsilyl group.

5. The composition for forming a coating film according to claim 3, wherein said R¹ᴬs are groups independently selected from the group consisting of alkyl group of 1 to 4 carbon atoms, alkoxy group of 1 to 3 carbon atoms and alkylsilyl group of 1 to 3 carbon atoms.

6. The composition for forming a coating film according to claim 3, wherein said R¹ᴬs are independently selected from the group consisting of methyl group, ethyl group, t-butyl group, trimethylsilyl group, methoxy group and ethoxy group.

7. The composition for forming a coating film according to claim 3, wherein n1A is 1 or more and 6 or less.

8. The composition for forming a coating film according to claim 1, wherein said silicon compound is represented by the following formula (1B):

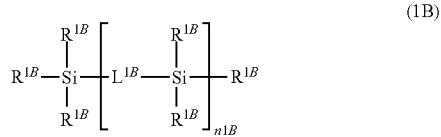

(1B)

wherein
R$^{1B}$s are monovalent groups independently selected from the group consisting of alkyl group, cycloalkyl group, aryl group, aryloxy group, heteroaryl group, aralkyl group, alkenyl group, alkynyl group, hydroxy group, hydroxyalkyl group, hydroxyalkenyl group, acyl group, acyloxy group, alkylamino group, alkyloxy group, silyl group and alkylsilyl group,
L$^{1B}$ is a connecting group selected from single bond, imide bond, imino group, carbonyl group, carbonyloxy group, unsaturated bond, and hydrocarbon chain, and
n1B is the number indicating degree of polymerization and exceeding 0, and
at least one of R$^{1B}$ and L$^{1B}$ contains an ethylene bond or an acetylene bond.

9. The composition for forming a coating film according to claim 8, wherein at least one R$^{1B}$ is a monovalent group selected from the group consisting of ethynyl group and vinyl group.

10. The composition for forming a coating film according to claim 8, wherein L$^{1B}$ is selected from the group consisting of single bond and imino group, and hydrocarbon chain, and at least one R$^{1B}$ is a monovalent group selected from the group consisting of ethynyl group and vinyl group.

11. The composition for forming a coating film according to claim 8, wherein n1B is one or more, L$^{1B}$ is imino group, and two R$^{1B}$ at both terminals of the molecular chain contain each an ethylene bond or an acetylene bond.

12. The composition for forming a coating film according to claim 8, wherein said silicon compound has a mass-average molecular weight of 50 to 200,000.

13. The composition for forming a coating film according to claim 1, wherein said silicon compound is represented by the following formula (1C):

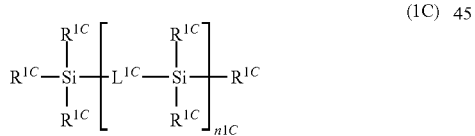

(1C)

wherein
R$^{1C}$s are monovalent groups independently selected from the group consisting of alkyl group, cycloalkyl group, heterocycloalkyl group, aryl group, heteroaryl group, arylamino group, hydroxy group, hydroxyalkyl group, acyl group, acyloxy group, amino group, alkylamino group, alkyloxy group, silyl group and alkylsilyl group,
L$^{1C}$ is a connecting group selected from alkylene group and arylene group that contain or do not contain oxy group, and n1C is the number indicating degree of polymerization and exceeding 1, and
none of R$^{1C}$s and L$^{1C}$ contains an ethylene bond or an acetylene bond.

14. The composition for forming a coating film according to claim 13, wherein said L$^{1C}$ is selected from the group consisting of 1,2-ethanedioxy group, 1,4-butanedioxy group, 1,6-hexanedioxy group, 1,4-cyclohexanedioxy group, phenylenedioxy group, bis(2-oxyethyl)ether group, ethylene group, tetramethylene group, hexamethylene group and phenylene group.

15. The composition for forming a coating film according to claim 13, wherein n1C is 1.

16. The composition for forming a coating film according to claim 1, wherein said silicon compound is represented by the following formula (1D):

(1D)

wherein
R$^{1D}$s are monovalent groups independently selected from the group consisting of alkyl group, aryl group, alkylamino group, arylamino group, imino group-containing alkyl group and imino group-containing alkylamino group, where the number of hydrogen atom bound to each silicon atom is 1 or less and the total number of carbon atoms and nitrogen atoms contained in all R$^{1D}$ is 8 or more.

17. The composition for forming a coating film according to claim 16, wherein said R$^{1D}$ is selected from the group consisting of alkyl group of 1 to 10 carbon atoms, aryl group of 6 to 12 carbon atoms, alkylamino group of 1 to 10 carbon atoms, arylamino group of 6 to 12 carbon atoms, imino group-containing alkyl group of 1 to 10 carbon atoms and imino group-containing alkyl group of 1 to 10 carbon atoms.

18. A method for forming a coating film, comprising:
(1) coating step, wherein the composition for forming a coating film according to claim 1 is coated on a substrate to form a composition layer, and
(2) exposure step, wherein said composition layer is exposed to light.

19. The method for forming a coating film according to claim 18, wherein said substrate is a plastic film.

20. The method for forming a coating film according to claim 18, wherein the thickness of said composition layer is 10 nm or more and 900 nm or less.

21. The method for forming a coating film according to claim 18, wherein the wavelength of said light is 161 to 248 nm.

22. The method for forming a coating film according to claim 18, wherein said exposure step is carried out in an inert gas atmosphere.

23. A coating film produced by the method according to claim 18.

* * * * *